United States Patent
Okazaki

(10) Patent No.: US 8,937,667 B2
(45) Date of Patent: Jan. 20, 2015

(54) IMAGE COMMUNICATION APPARATUS AND IMAGING APPARATUS

(71) Applicant: Panasonic Corporation, Osaka (JP)

(72) Inventor: Yoshinori Okazaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 62 days.

(21) Appl. No.: 13/661,166

(22) Filed: Oct. 26, 2012

(65) Prior Publication Data

US 2013/0107062 A1    May 2, 2013

(30) Foreign Application Priority Data

Oct. 27, 2011    (JP) .................... 2011-235769

(51) Int. Cl.
*H04N 5/225* (2006.01)
*H04N 5/232* (2006.01)

(52) U.S. Cl.
CPC ....... *H04N 5/23203* (2013.01); *H04N 5/23216* (2013.01); *H04N 5/23293* (2013.01); *H04N 5/23296* (2013.01)
USPC ................. 348/211.8; 348/207.11; 348/211.2

(58) Field of Classification Search
USPC ................. 348/207.1, 207.11, 211.99, 211.1, 348/211.2, 211.4, 211.8
See application file for complete search history.

(56) References Cited

U.S. PATENT DOCUMENTS

| 5,479,206 | A | 12/1995 | Ueno et al. |
| 6,768,563 | B1 | 7/2004 | Murata et al. |
| 7,327,387 | B2 * | 2/2008 | Tanaka et al. ............ 348/207.99 |
| 7,340,766 | B2 * | 3/2008 | Nagao et al. ................... 725/105 |
| 8,089,505 | B2 * | 1/2012 | Arima et al. ............... 348/14.07 |
| 8,146,124 | B2 * | 3/2012 | Kitagawa ...................... 725/105 |
| 2007/0070240 | A1 * | 3/2007 | Oya .............................. 348/375 |

FOREIGN PATENT DOCUMENTS

| JP | 5-219428 | 8/1993 |
| JP | 5-219430 | 8/1993 |
| JP | 8-237590 | 9/1996 |

* cited by examiner

*Primary Examiner* — Daniel M Pasiewicz
(74) *Attorney, Agent, or Firm* — Panasonic Patent Center

(57) ABSTRACT

An image communication apparatus communicating with an imaging apparatus includes a user interface that receives an instruction for setting a shooting condition in the imaging apparatus, a communication interface that periodically obtains an image captured by the imaging apparatus from the imaging apparatus, and communicates a request to the imaging apparatus in response to the instruction, a display device that displays the obtained captured image, and a controller that executes processes according to the instruction on the captured image obtained from the imaging apparatus, and generates a display image, and that displays the display image on the display device when the request is transmitted to the imaging apparatus.

6 Claims, 10 Drawing Sheets

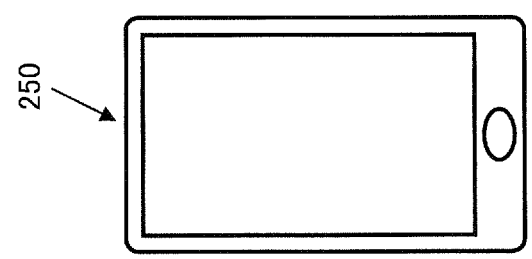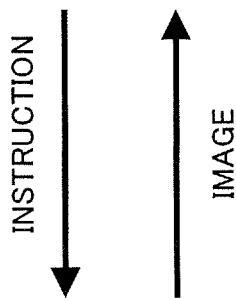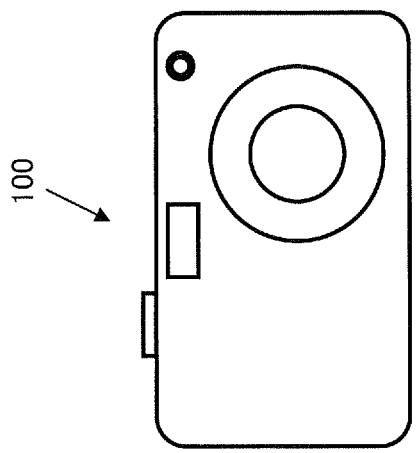
Fig. 1

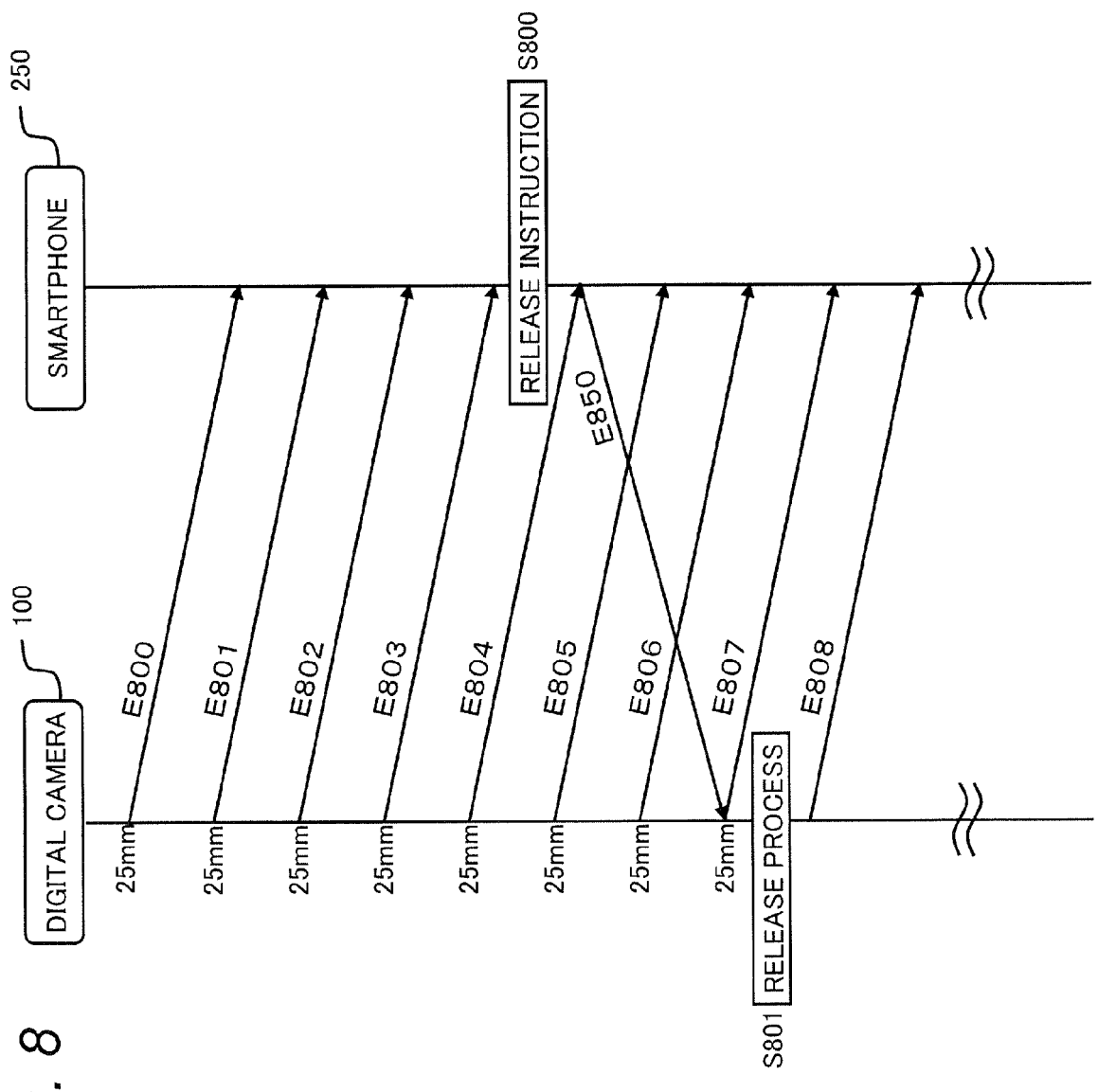

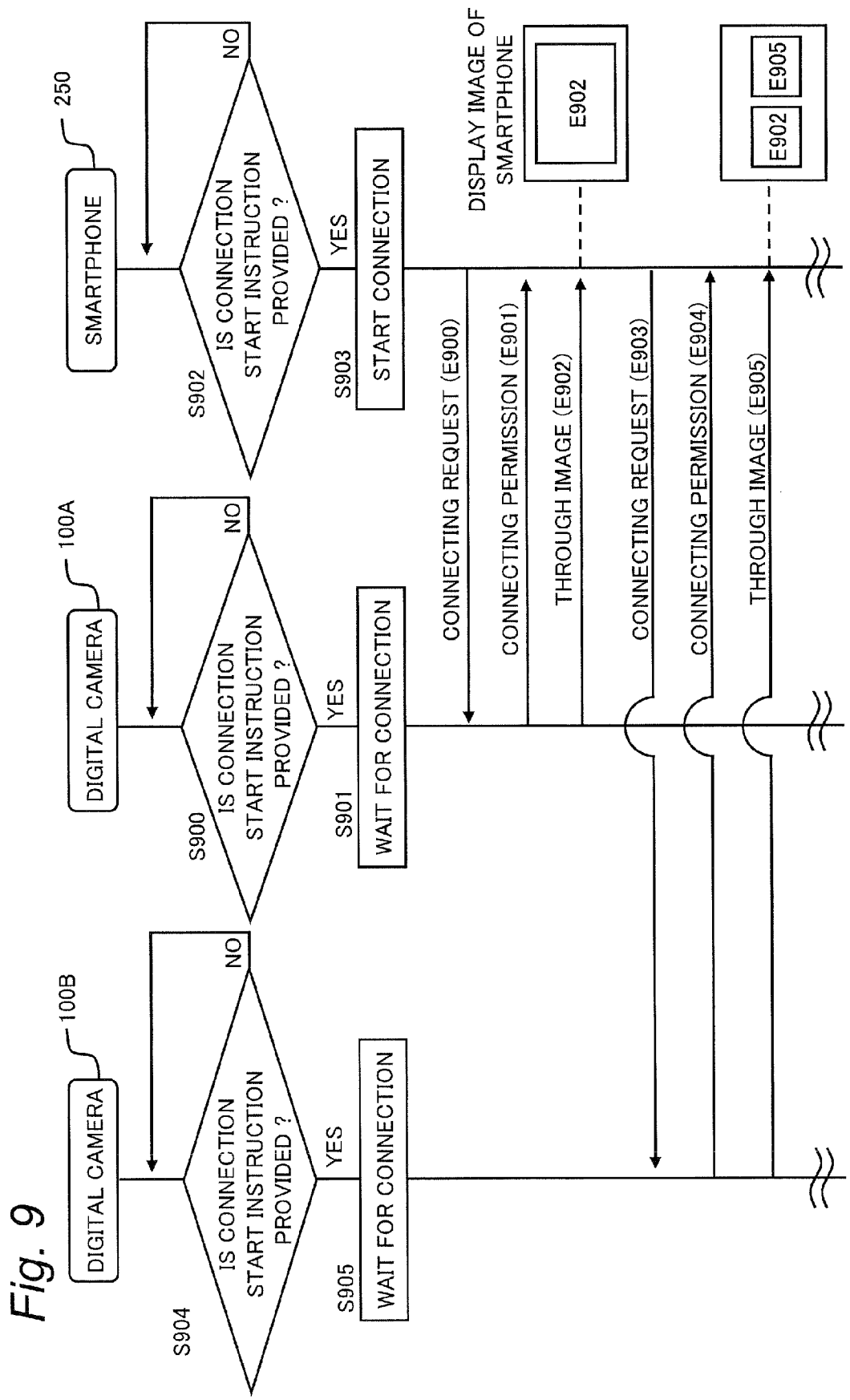

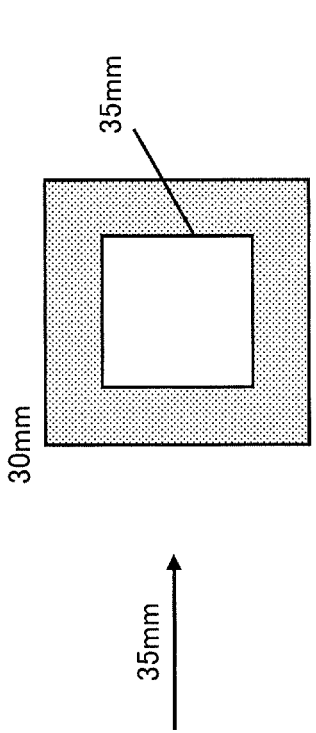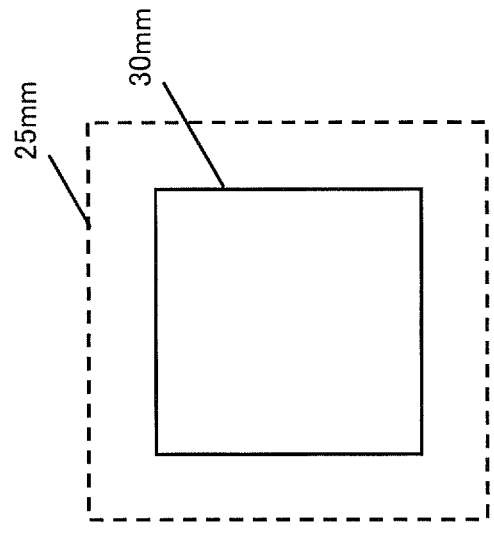
Fig. 10A
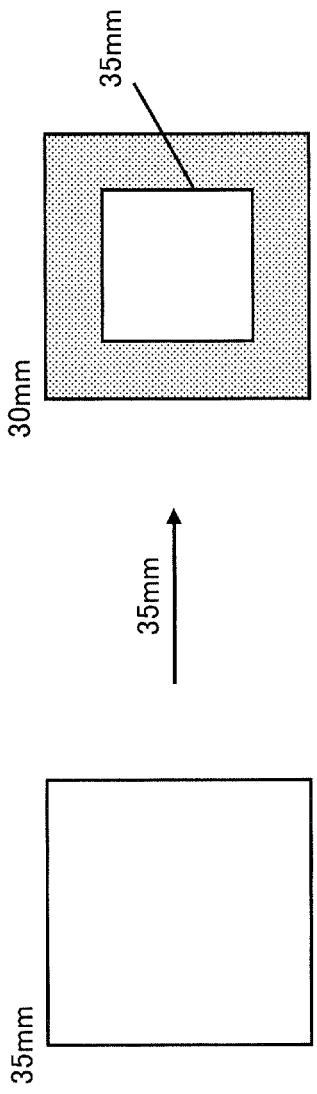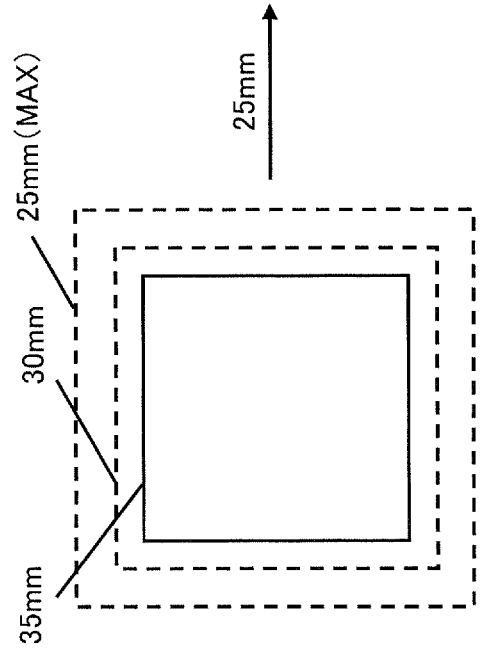
Fig. 10B

IMAGE COMMUNICATION APPARATUS AND IMAGING APPARATUS

BACKGROUND

1. Technical Field

The present disclosure relates to an imaging apparatus for capturing an image and an image communication apparatus capable communicating with the imaging apparatus.

2. Related Art

An art for remotely operating a digital camera with another electronic control device is known. For example, JP05-219430A discloses an art for enabling a host computer to perform setting of camera control parameters such as an exposure amount and white balance by the imaging system composed of the digital camera and the host computer.

SUMMARY

When a digital camera is remotely operated with another electronic control device, the following problem would arise. That is, a delay time occurs due to time required for a communication process, an imaging process, and other process after the digital camera is remotely operated via the electronic control device until a photographed image resulting from the remote operation is actually obtained. The delay time in the remote operation disables a user to comfortably (suitably) obtain a result obtained by reflecting instruction intended by the user on the digital camera. That is to say, the conventional remote operation is not convenient for a user.

An object of the present disclosure is to provide an imaging system that enables a user to comfortably obtain a result obtained by applying instruction intended by the user to the imaging apparatus when the imaging apparatus is remotely operated via an image communication apparatus.

A first image communication apparatus according to the present disclosure is image communication apparatus communicating with an imaging apparatus. The image communication apparatus includes a user interface that receives an instruction for setting a shooting condition in the imaging apparatus, a communication interface that periodically obtains an image captured by the imaging apparatus from the imaging apparatus, and communicates a request to the imaging apparatus in response to the instruction, a display device that displays the obtained captured image, and a controller that executes processes according to the instruction on the captured image obtained from the imaging apparatus, and generates a display image, and that displays the display image on the display device when the request is transmitted to the imaging apparatus.

A second image communication apparatus according to the present disclosure is an image communication apparatus communicating with an imaging apparatus. The image communication apparatus includes a user interface that receives an instruction for the imaging apparatus to start a shooting of an image to be recorded, an communication interface that periodically obtains an image captured by the imaging apparatus from the imaging apparatus, a display unit operable to display the obtained captured image, a controller that, when the user interface receives the instruction, controls the communication interface to communicate, to the imaging apparatus, a request based on the instruction and an identification information for specifying the captured image obtained from the imaging apparatus at a time of receiving the instruction.

A first imaging apparatus according to the present disclosure is an imaging apparatus communicating with the first image communication apparatus. The first imaging apparatus includes an image sensor that generates a captured image on the basis of a shooting condition, a communication interface that receives the request from the image communication apparatus and transmits the captured image generated by the imaging unit to the image communication apparatus, and a controller that changes the shooting condition in the image sensor on a basis of the request when receiving the request from the image communication apparatus.

A second imaging apparatus according to the present disclosure is an imaging apparatus communicating with the second image communication apparatus. The second imaging apparatus includes an image sensor that periodically generates a captured image, a recording medium that records the images periodically generated by the imaging unit, a communication interface that receives the request and the identification information from the image communication apparatus, and transmits the captured image generated by the imaging unit to the image communication apparatus, and a controller that controls an operation of the communication interface. When the communication interface receives the request from the image communication apparatus, the controller specifies one image from a plurality of images recorded in the recording medium on a basis of the identification information received together with the request, and transmits the specified one image to the image communication apparatus.

According to the present disclosure, the imaging system enables a user to more comfortably obtain a result obtained by applying user's instruction contents when the imaging apparatus is remotely operated via the image communication apparatus.

BRIEF DESCRIPTION OF DRAWINGS

FIG. 1 is a configuration diagram illustrating a system composed of a digital camera 100 and a smartphone 250;

FIG. 8 is a timing chart illustrating the release operation to the digital camera 100 in the smartphone 250 according to a second embodiment;

FIG. 9 is a sequence diagram relating to an operation for connecting between a plurality of digital cameras 100A, 100B and the smartphone 250; and FIGS. 10A, 10B are diagrams for describing display image generation in the zoom operation from a telephoto side to a wide-angle side.

DETAILED DESCRIPTION OF PREFERRED EMBODIMENTS

Embodiments will be described in detail below with reference to the drawings. In the detailed description, certain unnecessary portions regarding, for example, conventional technology, redundant description on substantially the same configuration may be omitted for ease of description.

The following description and the accompanying drawings are disclosed to enable those skilled in the art to sufficiently understand the present disclosure, and are not intended to limit the subject matter of the claims.

1. First Embodiment

The first embodiment will be described with a digital camera and a smartphone as examples.

1-1. Configuration

A configuration of an imaging system according to the present embodiment will be described below with reference to the drawings.

1-1-1. Configuration of Imaging System

FIG. 1 is a diagram illustrating a configuration of the imaging system according to the present embodiment. As shown in FIG. 1, the imaging system according to the present embodiment is composed of a digital camera 100 and a smartphone 250.

The digital camera 100 has a communication unit for transmitting captured image data on a shooting standby screen (hereinafter, "through image") and recorded image data (hereinafter, "recorded image") to the smartphone 250. On the other hand, the smartphone 250 has a communication unit for receiving a through image and a recorded image transmitted from the digital camera 100. When receiving a through image from the digital camera 100, the smartphone 250 displays the through image on a display unit of the smartphone 250. Further, the smartphone 250 can provide a zoom operating instruction of the digital camera 100 and a release button pressing instruction (remote operation) to the digital camera 100 via communication unit included in smartphone 250. The digital camera 100 receives the instructions of the smartphone 250 via the communication unit in the digital camera 100 to perform operations according to the received instructions.

That is to say, the present disclosure provides the imaging system that enables the smartphone 250 to perform remote operations (the zoom operation, the release operation, and other operations) to the digital camera 100.

1-1-2. Configuration of Digital Camera

Figure 2:
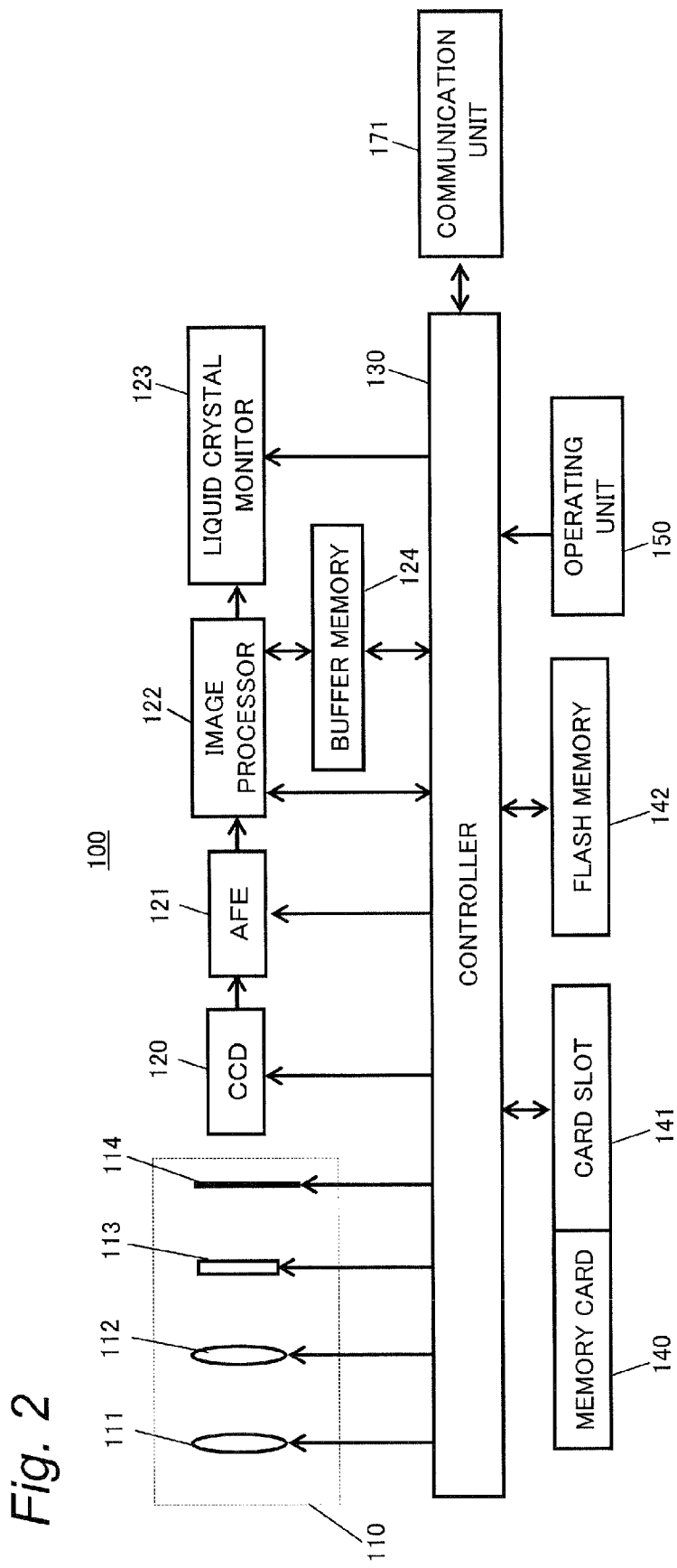
FIG. 2 is a diagram illustrating an electric configuration of the digital camera 100.

FIG. 2 is a diagram illustrating an electric configuration of the digital camera 100. The digital camera 100 captures a subject image formed via an optical system 110 with a CCD image sensor 120. The CCD image sensor 120 generates image data based on the captured subject image. The image data generated via capturing is subject to various processes in an AFE (analog front end) 121 and an image processor 122. The generated image data is recorded in a flash memory 142 and/or a memory card 140. The image data (recorded image) recorded in the flash memory 142 and/or the memory card 140 is displayed (reproduced) on a liquid crystal monitor 123 when an operating unit 150 receives a user's operation.

The optical system 110 is composed of a focus lens 111, a zoom lens 112, a diaphragm 113, a shutter 114, and the like. Not shown, but the optical system 110 may include an optical camera shake correction lens as OIS (Optical Image Stabilizer). Each lens in the optical system 110 may be composed of any number of lenses or any number of lens groups.

The CCD image sensor 120 captures a subject image formed via the optical system 110 to generate image data. The CCD image sensor 120 generates image data of a new frame at a predetermined frame rate (for example, 30 frames /sec.). Timing of image data generation of the CCD image sensor 120 and an electronic shutter operation are controlled by a controller 130. Since the image data is displayed as a through image one by one on the liquid crystal monitor 123, the user can check a condition of a subject on the liquid crystal monitor 123 at real time.

In the AFE 121, the image data read from the CCD image sensor 120 is subject to noise reduction by means of correlation double sampling, amplification of gains based on ISO sensitivity values by means of an analog gain controller, and AD conversion by means of an AD converter. Then, the AFE 121 outputs the image data to the image processor 122.

The image processor 122 performs various processes on the image data output from the AFE 121. The various processes include BM (block memory) integration, smear correction, white balance correction, gamma correction, an YC converting process, an electronic zoom process, a compressing process, an extending process, and the like, but the processes are not limited to them. The image processor 122 may be composed of a hard-wired electronic circuit, a microcomputer with a program, or the like. Further, the image processor 122 may be composed of one semiconductor chip integrally with the controller 130 and the like.

The liquid crystal monitor 123 is provided on a rear surface of the digital camera 100. The liquid crystal monitor 123 displays an image based on image data processed by the image processor 122. Images displayed on the liquid crystal monitor 123 include through images and recorded images.

The controller 130 controls an entire operation of the digital camera 100. The controller 130 may be composed of a hard-wired electronic circuit, a microcomputer, or the like. Further, the controller 130 may be composed of one semiconductor chip integrally with the image processor 122 and the like.

The flash memory 142 functions as an internal memory for recording image data or the like. The flash memory 142 stores a program relating to autofocus control (AF control), a program relating to communication control, and a program for controlling the entire operation of the digital camera 100.

A buffer memory 124 is a storage means which functions as work memories for the image processor 122 and the controller 130. The buffer memory 124 can be implemented with DRAM (Dynamic Random Access Memory) and the like.

A card slot 141 is a connection means to which the memory card 140 can be attached. The card slot 141 can be electrically and mechanically connected to the memory card 140. Further, the card slot 141 may have a function for controlling the memory card 140.

The memory card 140 is an external memory containing a recording unit such as a flash memory or other memory. The memory card 140 can record data such as image data processed by the image processor 122.

A communication unit 171 is a wireless or wired communication interface. The controller 130 can be connected to an internet network via the communication unit 171 and an access point. For example, the communication unit 171 can be implemented with USB, Bluetooth (registered trade name), wireless LAN, wired LAN, or other interface.

The operating unit 150 is a general name of operation buttons and an operation lever provided on an outer package of the digital camera 100. The operating unit 150 receives user's operations. When receiving an operation from the user, the operating unit 150 notifies the controller 130 of various operation instructing signals.

1-1-3. Configuration of Smartphone

Figure 3:
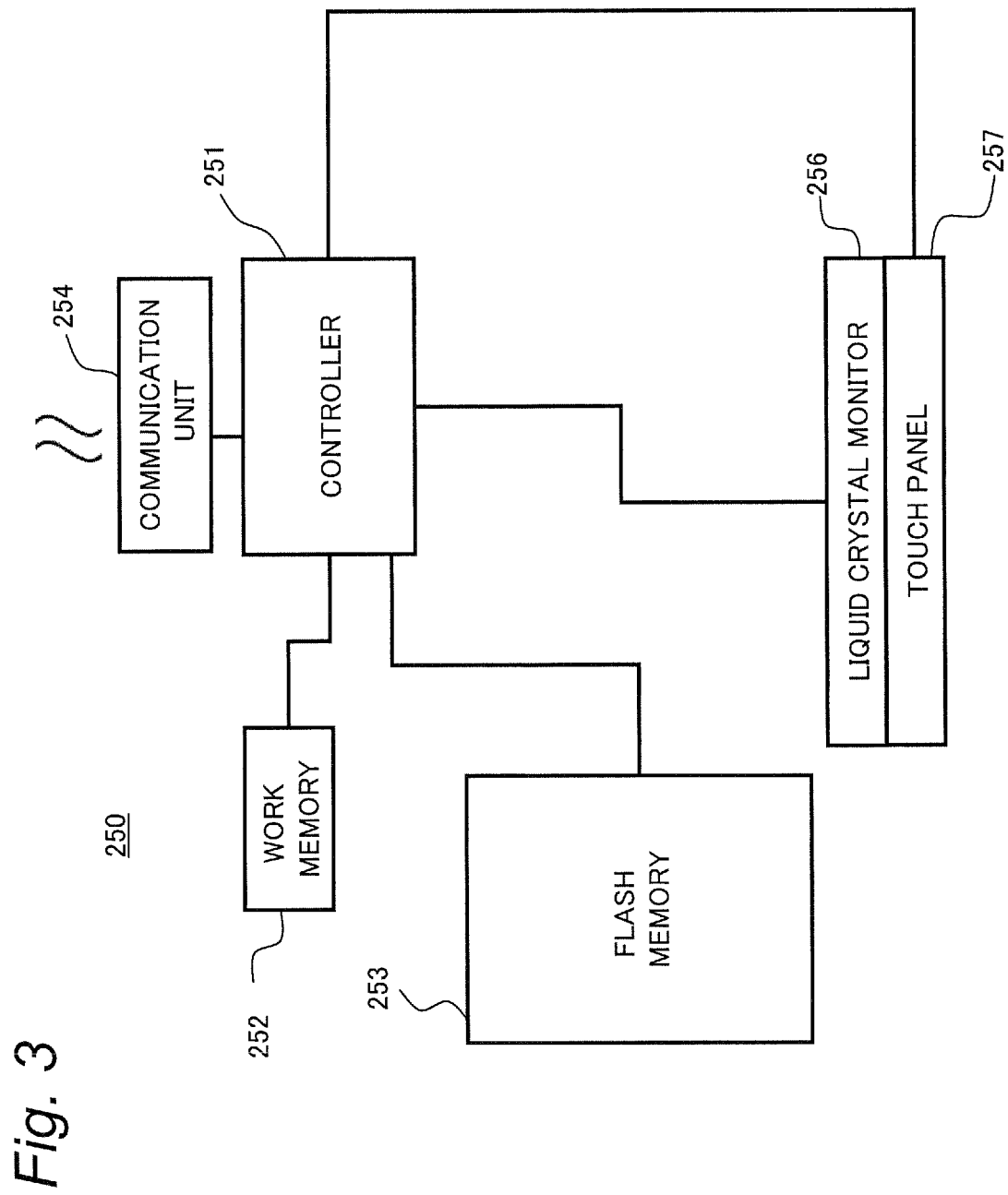
FIG. 3 is a diagram illustrating an electric configuration of the smartphone 250.

FIG. 3 is a diagram illustrating an electric configuration of the smartphone 250. A configuration of the smartphone 250 will be described with reference to FIG. 3.

The smartphone 250 is composed of a controller 251, a work memory 252, a flash memory 253, a communication unit 254, a liquid crystal monitor 256, a touch panel 257, and the like. The smartphone 250 may be further provided with the imaging unit and the image processor.

The controller 251 is a processor for controlling the entire process in the smartphone 250. The controller 251 is electrically connected to the work memory 252, the flash memory 253, the communication unit 254, the liquid crystal monitor 256, and the touch panel 257. The controller 251 receives operation information indicating user's operations with the touch panel 257. The controller 251 can read data stored in the flash memory 253. The controller 251 controls power to be supplied to the respective units of the smartphone 250. The controller 251 executes a telephone function and various applications downloaded via the internet.

The work memory 252 is a memory for temporarily storing information necessary for executing the various processing operations in the controller 251.

The flash memory 253 is a high-capacity disc drive for storing various data. The various data stored in the flash memory 253 can be suitably read by the controller 251. In the present embodiment, the flash memory 253 is used as a recording medium, but a hard disc drive or the like may be used instead of the flash memory 253.

The liquid crystal monitor 256 is a display device for displaying a screen instructed by the controller 251.

The touch panel 257 is an input device (a user interface) for receiving user's operations. The touch panel 257 transmits operation information according to the received user's operations to the controller 251. In the present embodiment, the touch panel 257 is provided as the input device for receiving the user's operations, but a hard key may be provided instead of the touch panel 257.

The communication unit 254 is a communication interface which can transmit image data received from the controller 251 to another device via the internet network. The communication unit 254 can be implemented with, for example, a wired LAN or a wireless LAN.

1-2. Operation 1-2-1. Connection Between Digital Camera and Smartphone

Figure 4:
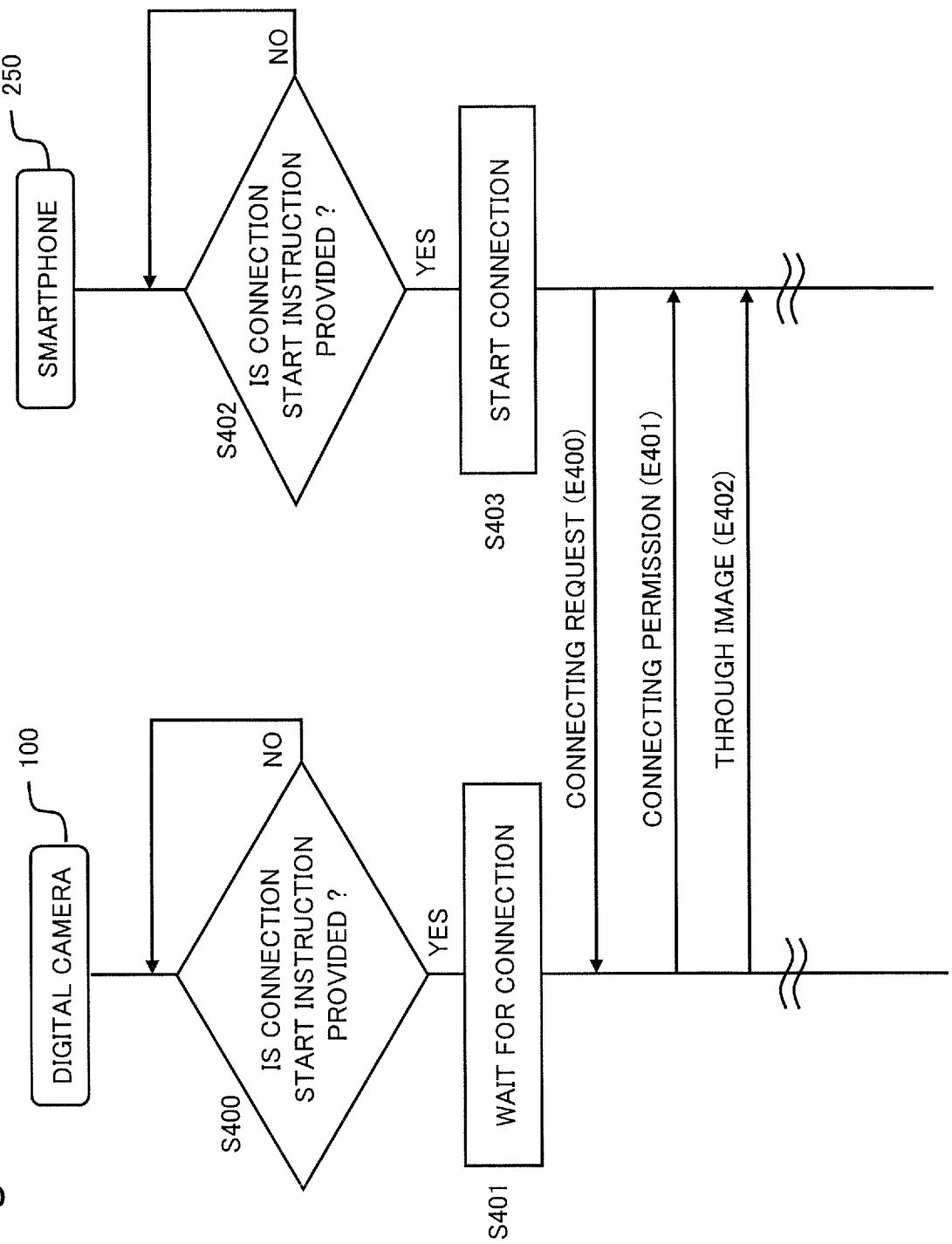
FIG. 4 is a sequence diagram concerning an operation for connecting between the digital camera 100 and the smartphone 250.

FIG. 4 is a sequence diagram illustrating an operation for connecting between the digital camera 100 and the smartphone 250. The operation for connecting between the digital camera 100 and the smartphone 250 will be described with reference to FIG. 4.

To begin with, an operation on the side of the digital camera 100 will be described. When the digital camera 100 is powered ON, the controller 130 of the digital camera 100 supplies power to the respective units composing the digital camera 100 to control the digital camera 100 into a state in which the digital camera 100 can shoot an image and communicate with other devices.

Then, the user operates the operating unit 150 of the digital camera 100 to cause the liquid crystal monitor 123 to display a menu screen. Then, the user operates the operating unit 150 to select a menu for providing a communication start instruction. When the user selects the menu for providing the communication start instruction (S400), the controller 130 searches for a connectable access point. Then, the controller 130 is connected with the found access point to obtain an IP address assigned to the digital camera 100. When the obtainment of the IP address is completed, the controller 130 transits into a waiting state in which the controller 130 waits for connection from the smartphone 250 (S401).

Next, an operation on a side of the smartphone 250 will be described. When the smartphone 250 is powered ON, the controller 251 of the smartphone 250 supplies power to the respective units composing the smartphone 250 to control the smartphone 250 into a state in which the smartphone 250 can communicate.

Then, the user operates the touch panel 257 of the smartphone 250 so that the liquid crystal monitor 256 displays the menu screen. Then the user operates the touch panel 257 to select a menu for providing the communication start instruction. When the user selects the menu for providing the communication start instruction (S402), the controller 251 searches for a connectable access point. Then, the controller 251 is connected to the found access point to obtain an IP address assigned to the smartphone 250. When the obtainment of the IP address is completed, the smartphone 250 transits into a state in which the smartphone 250 starts to connect with the digital camera 100 (S403).

Then, the controller 251 of the smartphone 250 notifies the controller 130 in the digital camera 100 of a connecting request via the communication unit 254 in the smartphone 250 (E400).

When receiving the connecting request, the controller 130 of the digital camera 100 notifies the smartphone 250 of the connecting permission via the communication unit 171 in the digital camera 100 (E401). As a result, the communication between the digital camera 100 and the smartphone 250 is established.

When the communication is established, the controller 130 of the digital camera 100 transmits a through image generated by the imaging unit (including the CCD image sensor 120, the image processor 122, and the like) of the digital camera 100 to the smartphone 250 via the communication unit 171 of the digital camera 100 (E402). In the digital camera 100, the imaging unit generates the through image of, for example, 30 frames per second. The controller 130 periodically transmits the through image of 30 frames per second to the smartphone 250. The controller 130 of the digital camera 100 continues to periodically transmit the through image as long as the imaging unit generates a through image and the communication state with respect to the smartphone 250 is maintained.

The above description illustrated the case in which the communication is established via the access point other than the digital camera 100 and the smartphone 250, but the communication between the digital camera 100 and the smartphone 250 may be established with another method. For example, the digital camera 100 and the smartphone 250 may establish the communication with means of an ad-hoc mode. In another manner, when any one of the digital camera 100 and the smartphone 250 has an access point function, the one device having the access point function may be connected to the other device to establish the communication.

1-2-2. Remote Zoom Operation to Digital Camera by Smartphone

Figure 5:
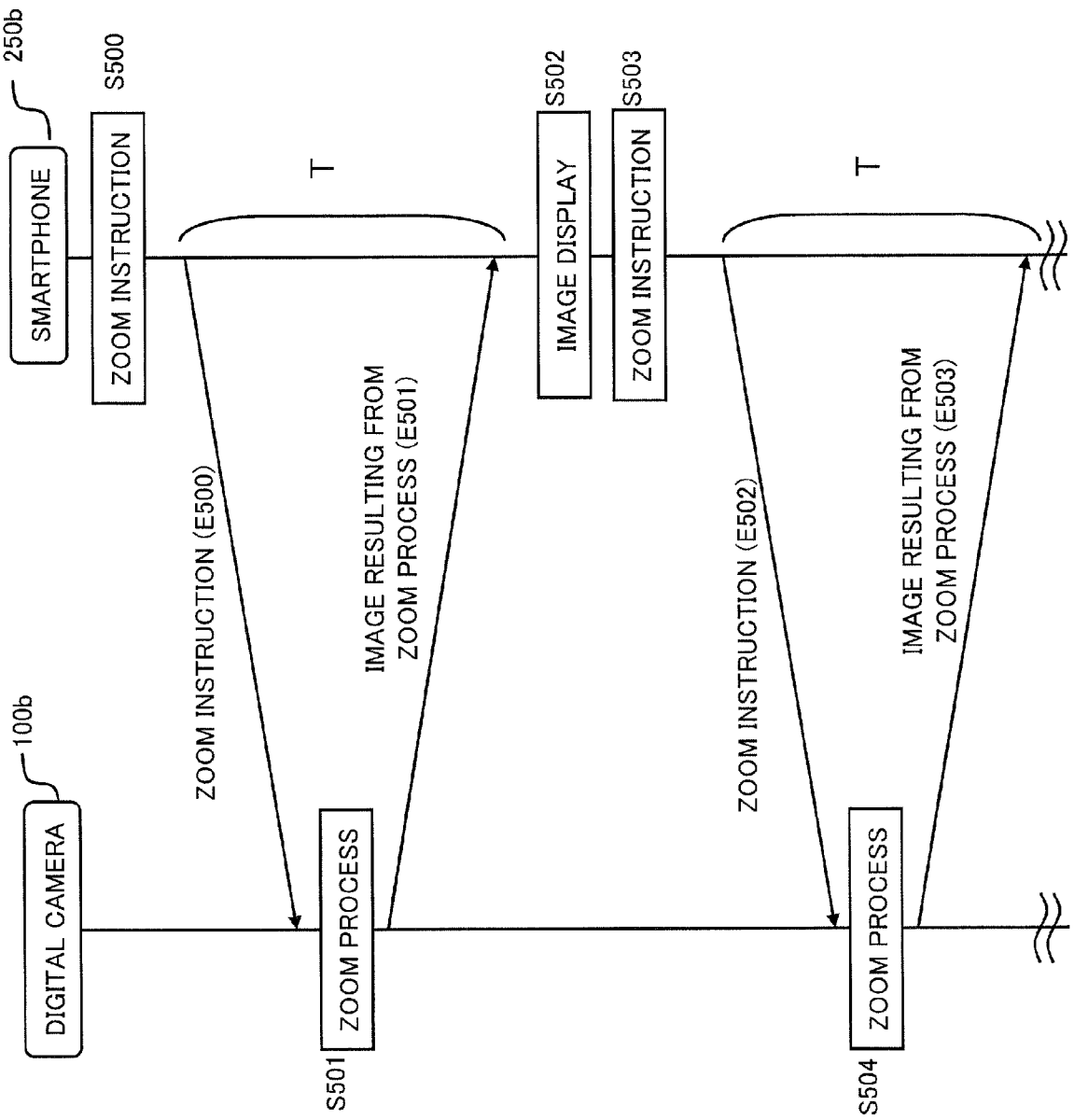
FIG. 5 is a timing chart illustrating a zoom operation to the digital camera in the conventional smartphone.
Figure 6:
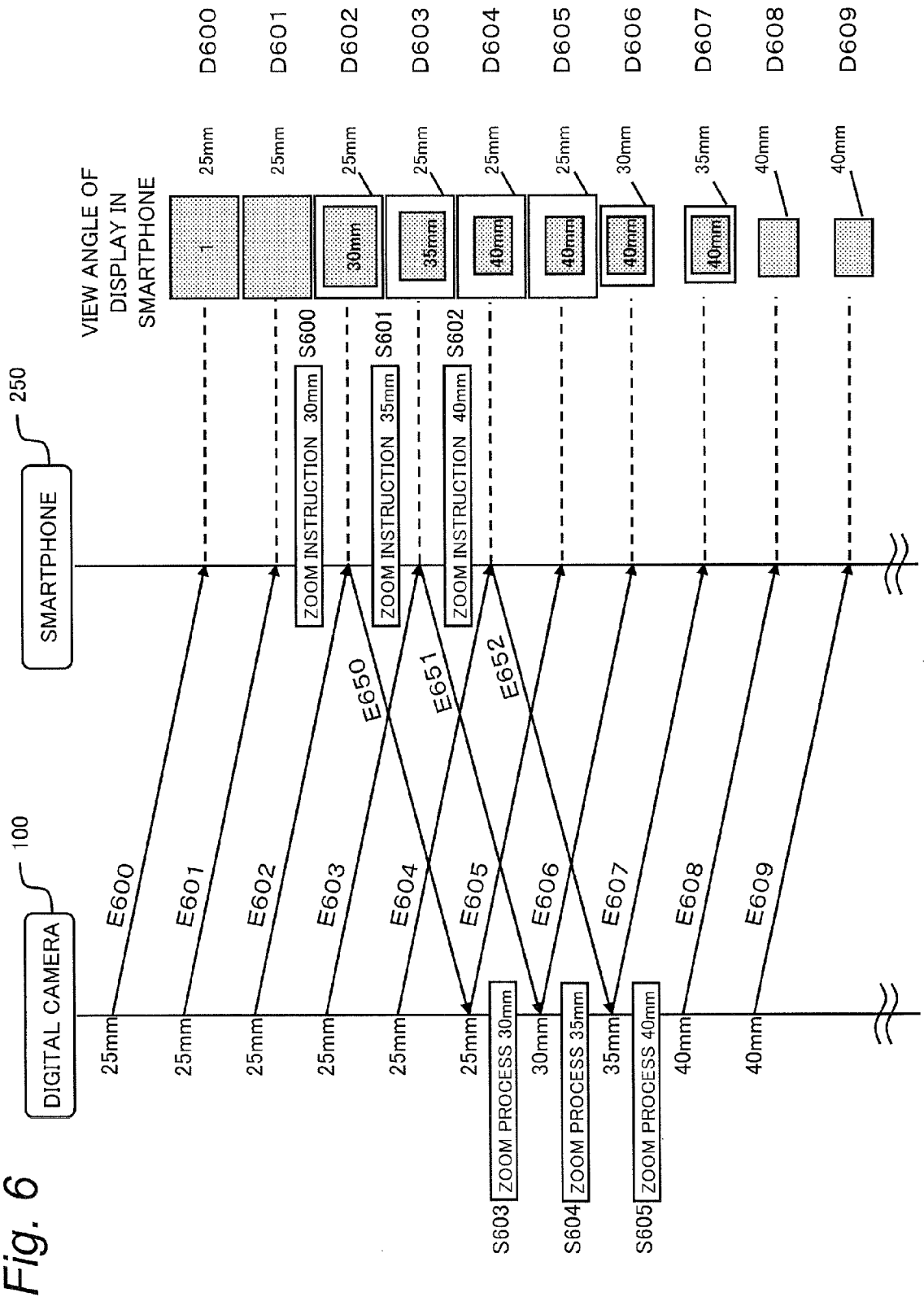
FIG. 6 is a timing chart illustrating the zoom operation to the digital camera 100 in the smartphone 250 according to a first embodiment.

The remote zoom operation to the digital camera 100 by the smartphone 250 will be described with reference to FIG. 5 and FIG. 6. FIG. 5 is a timing chart illustrating the zoom operation (the operation for changing zoom magnification) of the digital camera in a conventional smartphone. FIG. 6 is a timing chart illustrating the zoom operation of the digital camera 100 in the smartphone 250 according to the present embodiment. In the present embodiment, a case in which the operation for zooming from a wide-angle side to a telephoto side is performed is described as an example.

The operation during the remote zoom operation of the digital camera 100b by the conventional smartphone 250b will be described with reference to FIG. 5. When the smartphone 250b operates the digital camera 100b remotely, delay caused by time for the processes in the digital camera 100 and the smartphone 250 occurs, and delay caused by time for reciprocating communication between the smartphone 250 and the digital camera 100 occurs. For this reason, as shown in FIG. 5, the zoom request instructed from the smartphone 250 to the digital camera 100 is reflected on a through image transmitted to the smartphone 250 with a delay by time T.

The delay time T will be specifically described. The smartphone 250b provides the zoom instruction to the digital camera 100b (S500). When receiving the zoom instruction (E500) from the smartphone 250b, the digital camera 100b performs the zoom process on the image captured by the imaging unit (the CCD image sensor 120, the image processor 122, and the like) (S501), and then transmits an image (E501) resulting from the zoom process based on the result of the zoom operation to the smartphone 250b. When receiving the image subject to the zoom process (namely, the through image after the zoom operation) from the digital camera 100b, the smartphone 250b displays that image on the liquid crystal monitor (S502). In such a manner, the delay in the process occurs by time T between the instruction from the smartphone 250b to the digital camera 100b and the display of the image. Thereafter, also when the zoom instruction is continuously provided to the digital camera 100b (S503, E502, S504 and E503), the process is always delayed by time T. The delay time T is sufficiently long in comparison with a case in which the zoom operation is directly performed to the digital camera 100, and thus deteriorates user's convenience.

Next, the remote zoom operation that is performed in the digital camera 100 by the smartphone 250 according to the present embodiment will be described with reference to FIG. 6.

In the present embodiment, a case in which a focal length (view angle) of the digital camera 100 before the zoom operation is 25 mm, and a change amount of zoom in each zoom operation is 5 mm in terms of the focal length will be described as an example.

The digital camera 100 is connected to the smartphone 250 via a wired LPN, and transmitting through images (E600 and E601) to the smartphone 250. The through images (E600 and E601) are images at a view angle corresponding to the focal length of 25 mm because the zoom operation is not yet performed. When receiving the through images (E600 and E601) from the digital camera 100, the smartphone 250 displays the through images on the liquid crystal monitor 265 of the smartphone 250 (D600 and D601). At this time, the focal length (view angle) at which the smartphone 250 instructs the digital camera 100 to shoot matches with the focal length corresponding to the view angle of the through images obtained from the digital camera 100.

Next, the operation performed when the smartphone 250 receives the zoom operation by the user will be described.

When the user provides a first zoom instruction to the digital camera 100 with the touch panel 257 of the smartphone 250, the smartphone 250 (the controller 251) receives the first zoom instruction (S600). Then, the smartphone 250 transmits, to the digital camera 100, the first zoom request (E650) based on the first zoom instruction from the user. The first zoom request (E650) is an instruction for requesting the digital camera 100 to change the focal length into 30 mm.

When receiving the first zoom request (E650) from the smartphone 250, the digital camera 100 performs the zoom process on the image captured by the imaging unit (the CCD image sensor 120, the image processor 122 and the like) so that the focal length (view angle) is set to 30 cm (S603). The digital camera 100 transmits the through image resulting from the zoom process to the smartphone 250 (E606). At this time, the smartphone 250 receives, from the digital camera 100, an image corresponding to the focal length of 30 mm resulting from the zoom process according to the first zoom request.

After the first zoom instruction (S600) is executed, the user provides the second zoom instruction by using the touch panel 257 of the smartphone 250 before reception of a result (E606) from the digital camera 100 based on the first zoom instruction. When receiving the second zoom instruction (S601), the smartphone 250 transmits a second zoom request (E651) based on the second zoom instruction (S601) to the digital camera 100. That is to say, the smartphone 250 transmits the zoom request to the digital camera 100 to cause the digital camera 100 to change the focal length into 35 mm.

The digital camera 100 performs the zoom process (S604) according to the second zoom request (E651) from the smartphone 250 to change the focal length (view angle) into 35 mm. The digital camera 100 transmits the through image resulting from the zoom process to the smartphone 250 (E607). At this time, the smartphone 250 receives, from the digital camera 100, an image corresponding to the focal length of 35 mm which is resulting from the zoom process performed according to the second zoom request.

After the second zoom instruction (S601) is executed, the user provides a third zoom instruction before reception of the result (E607) from the digital camera 100 based on the second zoom instruction. When receiving the third zoom instruction (S602), the smartphone 250 transmits a third zoom request (E652) based on the third zoom instruction to the digital camera 100. That is to say, the smartphone 250 transmits the zoom request to the digital camera 100 to cause the digital camera 100 to change the focal length into 40 mm.

The digital camera 100 performs the zoom process according to the third zoom request (E652) from the smartphone 250 (S605) to change the focal length (view angle) into 40 mm. The digital camera 100 transmits a through image resulting from the zoom process to the smartphone 250 (E608).

In such a manner, the smartphone 250 transmits the zoom request to the digital camera 100 according to the zoom operation that the user performs with the touch panel 257. The digital camera 100 performs the zoom process according to the received zoom request. Further, the digital camera 100 periodically captures a through image to transmit the through image captured to the smartphone 250.

An operation for displaying the through images on the liquid crystal monitor 256 of the smartphone 250 during the remote zoom operation regarding the digital camera 100 in order to solve the above problem caused by the delay time T will be described below.

Just after transmitting the first zoom request (E650) to the digital camera 100, the smartphone 250 does not yet receive the through image corresponding to the focal length of 30 mm from the digital camera 100, and receives only the through image (E602) corresponding to the focal length of 25 mm. The smartphone 250 according to the present embodiment generates a through image corresponding to the focal length of 30 mm from the received through image corresponding to the focal length of 25 mm to display the generated through image on the liquid crystal monitor 256 (D602) in order to solve the above problem of the delay time T. Specifically, the smartphone 250 cuts out the image corresponding to the focal length of 30 mm from the through image (E602) corresponding to the focal length of 25 mm received from the digital camera 100, and then displays the cut-out image on the liquid crystal monitor 256 (D602). As a result, before actually receiving the image (E606) resulting from the first zoom process from the digital camera 100, the smartphone 250 can display an image to which the first zoom process seems to be applied on the liquid crystal monitor 256. As a result, the user can perform the zoom operation to the digital camera 100 more comfortably without feeling delay time T.

Just after transmitting the second zoom request (E651) to the digital camera 100, the smartphone 250 does not yet receive the through image corresponding to the focal length of 35 mm from the digital camera 100, and receives only the through image (E603) corresponding to the focal length of 25 mm. The smartphone 250 cuts out the image corresponding to the focal length of 35 mm from the through image corresponding to the focal length of 25 mm (E603) received from the digital camera 100, and then displays the cut-out image on the liquid crystal monitor 256 of the smartphone 250 (D603).

Similarly, also just after transmitting the third zoom request (E652), the smartphone cut out an image corresponding to the focal length of 40 mm from the through image corresponding to the focal length of 25 mm (E604) received from the digital camera 100 to display the cut-out through image on the liquid crystal monitor 256 of the smartphone 250 (D604).

As described above, before reception of the result in response to the zoom instruction provided from the smartphone 250 to the digital camera 100, the smartphone 250 generates and displays an image to which the zoom process seems to be applied by the digital camera 100 on the basis of the through image already obtained and the content of the zoom instruction. This arrangement provides a user with an operational feeling such that a user seems to directly perform the zoom operation on the digital camera 100 without feeling the delay time T.

An operation in the smartphone 250 at the end of the zoom operation will be described below. The user completes the zoom instruction to the digital camera 100 by providing the third zoom instruction (S602).

Just after transmitting the third zoom request (E652) to the digital camera 100, the smartphone 250 does not yet receive the result of the first zoom request (E650). For this reason, the smartphone 250 continues to receive the through image (E605) corresponding to the focal length of 25 mm. The smartphone 250 cuts out an image corresponding to the focal length of 40 mm from the through image corresponding to the focal length of 25 mm to generate a through image as if a through image corresponding to the focal length of 40 rim is obtained from the digital camera 100, and then displays the through image on the liquid crystal monitor 256 of the smartphone 250 (D605).

Thereafter, the smartphone 250 receives a through image (E606) resulting from the zoom process (S603) in the digital camera 100 which is based on the first zoom request (E650). At this time, the through image (E606) received by the smartphone 250 becomes an image corresponding to the focal length of 30 mm based on the first zoom request (E650). Since the third zoom request (the request for changing the focal length into 40 mm) is already transmitted at this time, the smartphone 250 cuts out the image corresponding to the focal length of 40 mm from the received through image (1606) based on the first zoom request (1650) to generate a through image, and then displays the through image on the liquid crystal monitor 256 of the smartphone 250 (D606). Similarly, the smartphone 250 cuts out the image corresponding to the focal length of 40 mm from the through image (E607) based on the second zoom request (E651) for requesting a change of focal length into 35 mm to generate the through image, and then displays the through image on the liquid crystal monitor 256 of the smartphone 250 (D607).

Finally, the smartphone 250 does not perform the cutting-out operation on the through image (E608) resulting from the zoom process (S605) in the digital camera 100 that is based on the third zoom request (E652) for requesting the change in the focal length into 40 mm, and displays the through image obtained from the digital camera 100 directly on the liquid crystal monitor 256 of the smartphone 250 (D608).

After the completion of the series of the zoom operation, since all the zoom operations are completed, the digital camera 100 continues transmitting a through image (E609) corresponding to the focal length of 40 mm. Further, since receiving through image (E609) corresponding to the focal length of 40 mm, the smartphone 250 does not carry out the image cutting out and displays the through image obtained from the digital camera 100 directly on the liquid crystal monitor 256 of the smartphone 250 (D609).

In the present embodiment, the zoom change amount as the conversion of the focal length in each zoom operation is a fixed value (the focal length: 5 mm), and is not specifically posted from the smartphone 250 to the digital camera 100. However, the zoom amount (the zoom amount corresponding to the set focal length such as 25 mm) may be posted from the smartphone 250 to the digital camera 100 in each zoom operation. In another manner, the zoom change amount for one zoom operation of the digital camera 100 may be posted from the digital camera 100 to the smartphone 250 at a time of connecting the smartphone 250 and the digital camera 100.

1-2-3. Release Operation to Digital Camera in the Smartphone

Figure 7:
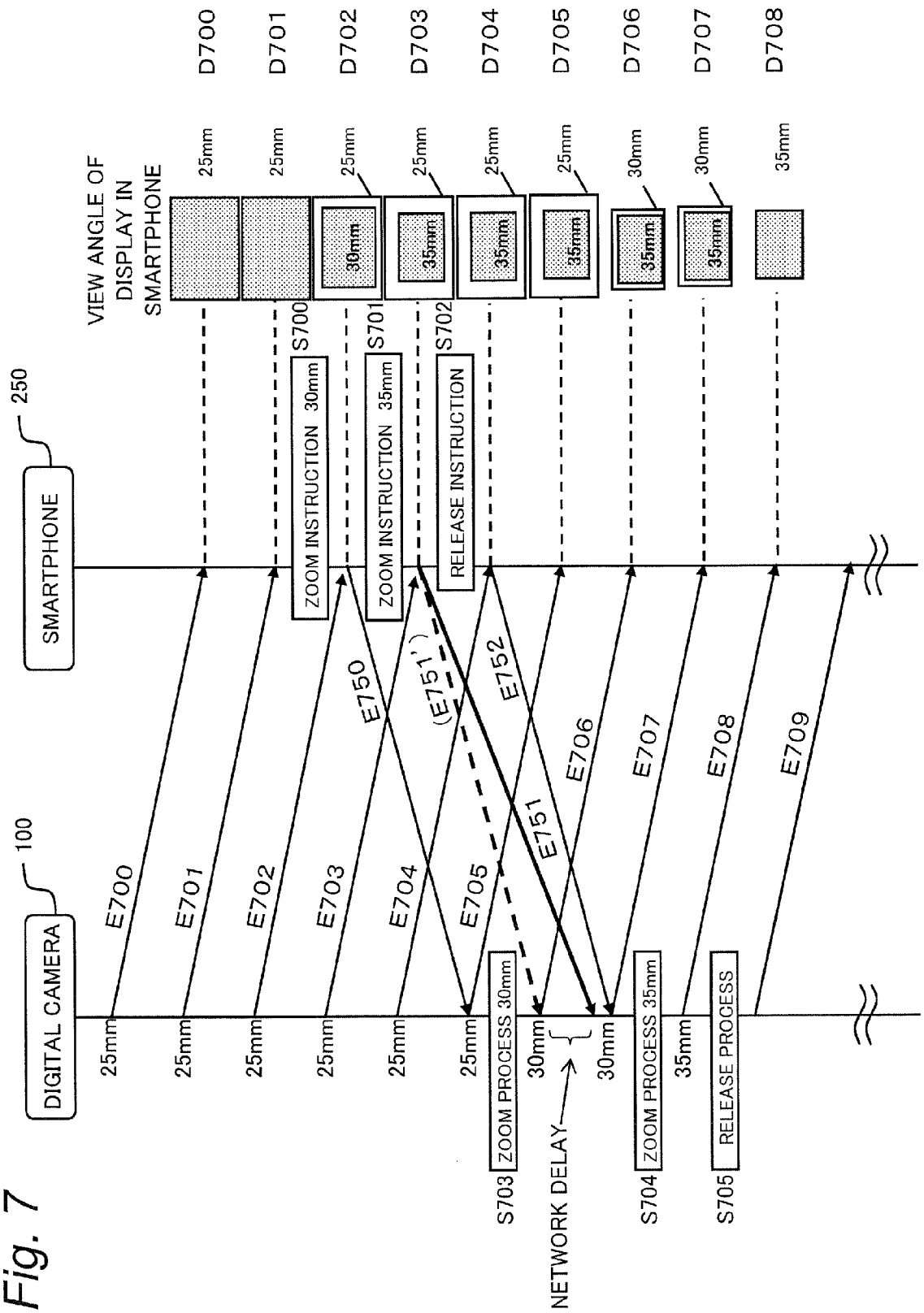
FIG. 7 is a timing chart illustrating a release operation to the digital camera 100 in the smartphone 250 according to the first embodiment.

The remote release operation to the digital camera 100 from the smartphone 250 will be described with reference to FIG. 7. FIG. 7 is a timing chart illustrating the remote release operation to the digital camera 100 in the smartphone 250 according to the present embodiment.

The release operation to the digital camera 100 in the smartphone 250 according to the first embodiment will be described with reference to FIG. 7.

FIG. 7 illustrates one example of operation of the imaging system performed when the smartphone 250 performs the release operation to the digital camera 100 just after the zoom operation of the digital camera 100 is performed. Since the operation up to the second zoom request (E700-E703, S700-S701, E750-E751) in the smartphone 250 is similar to the operation up to the second zoom request (E600-E603, S600-S601, E650-E651) in FIG. 6, the description thereof is omitted.

In FIG. 7, the second zoom request (E751') shown by a broken line illustrates the second zoom request arriving at the digital camera 100 without a delay, and the second zoom request (E751) shown by a solid line illustrates the second zoom request arriving at the digital camera 100 behind original arrival time due to network delay or the like. In the following description, the second zoom request arrives at the digital camera 100 behind the original arrival time due to network delay or the like.

It is assumed that the user provides the second zoom instruction (S701) to the digital camera 100 with the touch panel 257 of the smartphone 250 and subsequently provides a release instruction (S702). In this case, the smartphone 250 transmits a release request (E752) to the digital camera 100 just after the second zoom request (E751). At this time, the smartphone 250 transmits, to the digital camera 100, latest information about the focal length (in FIG. 7, corresponding to the focal length of 35 mm) that is requested to the digital camera 100 when the smartphone 250 receives the release instruction (S702), together with the release request (E752).

On the other hand, when receiving the release request (E752) and the latest information about the focal length (in FIG. 7, corresponding to the focal length of 35 mm) from the smartphone 250, the digital camera 100 performs the zoom process based on the received latest information about the focal length. Specifically, the digital camera 100 determines whether or not the current focal length for zoom is equal to the latest focal length indicated by the received information. When the current focal length for zoom does not yet arrives at the latest focal length, the digital camera 100 waits for completion of the zoom process (here, the zoom process based on the second zoom request). After the completion of the zoom process, the digital camera 100 performs the process similar to the process performed when the digital camera 100 receives the release button operation to transmit an image (recorded image E709) resulting from the release process to the smartphone 250.

With the above configuration, even when receiving the release request before the completion of the zoom process based on the zoom request received before the reception of the release request, the digital camera 100 waits for the completion of the zoom process and then performs the release process. For example, in the example shown in FIG. 7, since arrival at the digital camera 100 of the second zoom request (E751) transmitted from the smartphone 250 is delayed due to network delay, the start and the completion of the zoom process are delayed. For this reason, at a time point at which the digital camera 100 receives the release request (E752), the zoom process based on the second zoom request (E751) is not yet completed. Therefore, just after the completion of the zoom process based on the second zoom request (E751), the digital camera 100 performs the release process (S705) to transmit the captured image (E709) as a recorded image to the smartphone 250. At the same time, the captured image is recorded as the recorded image into the memory card 140.

As a result, when the user provides the release instruction at desired timing (view angle) while viewing the through image displayed on the liquid crystal monitor 256 of the smartphone 250, and the image based on the zoom instruction is not yet obtained from the digital camera 100, the image at the view angle (focal length) corresponding to the timing of the release instruction can be captured. That is to say, the image can be captured at the view angle intended by the user who performs the release operation on the smartphone 250.

2. Second Embodiment

In the first embodiment, the image data at the view angle (focal length) corresponding to the timing of the release instruction by the user with the smartphone 250 is recorded. In contrast, in the present embodiment, image data captured by the digital camera 100 at a time point corresponding to the timing of the release instruction by the user is recorded.

Since the configurations of the system, the digital camera 100, and the smartphone 250 according to the present embodiment is similar to the configurations according to the first embodiment, description thereof will be omitted. Further, since the operation for connecting between the digital camera 100 and the smartphone 250 is similar to that described with reference to FIG. 4, description thereof will be omitted.

The remote release operation to the digital camera 100 in the smartphone 250 according to the present embodiment will be described with reference to FIG. 8. FIG. 8 is a timing chart illustrating the remote release operation to the digital camera 100 in the smartphone 250 according to the present embodiment. FIG. 8 illustrates one example of the operation of the system performed when the remote release operation to the digital camera 100 is performed in the smartphone 250.

The digital camera 100 is connected to the smartphone 250 to periodically transmit the through images (E800-E807) to the smartphone 250. When receiving the through images (E800-E807), the smartphone 250 displays the through images on the liquid crystal monitor 256 of the smartphone 250. At this time, identifiers for identifying the through images are given to the through images (E800-E807) transmitted by the digital camera 100. The identifiers are, for example, time at which the digital camera 100 generates the images. The identifiers may be for uniquely identifiable for a certain period, and may be simply incremented numbers, alphabets, or the like.

Then, the user provides the release instruction (S800) to the digital camera 100 with the touch panel 257 of the smartphone 250. At this time, the smartphone 250 is displaying a through image (E803) on the liquid crystal monitor 256. The smartphone 250 transmits the release request (E850) to the digital camera 100 according to the user's instruction. The release request is given an identifier of the through image transmitted from the digital camera 100 that is displayed on the liquid crystal monitor 256 at the time of receiving the release instruction by the user. For example, in the example of FIG. 8, if the through image (E803) is displayed on the liquid crystal monitor 256 when the release instruction is received from the user, the smartphone 250 notifies the digital camera 100 of the identifier of the through image (E803) together with the release request (E850).

When receiving the release request (E850) and the identifier of the through image (E803) from the smartphone 250, the digital camera 100 refers to the identifier to specify image data generated at the time when the through image (E803) corresponding to the identifier is generated. The image data is specified as follows. The digital camera 100 according to the present embodiment does not delete a plurality of images generated by the imaging unit even after the transmission of the plurality of images to the smartphone 250, and retains the images in the flash memory 142. At this time, the digital camera 100 retains the image data transmitted from the digital camera 100 to the smartphone 250 and the identifier corresponding to the image data in the flash memory 142 for delay time, for at least a period from the providing of the release instruction in the smartphone 250 to the actual execution of the release process in the digital camera 100. In such a manner, by referring to the image data and the identifier retained in the flash memory 142, the digital camera 100 can specify image data at the passed time as an image captured at the time of providing the release instruction.

The digital camera 100 records the specified image data as a recorded image (E808) in the memory card 140, and then transmits the recorded image (E808) to the smartphone 250. As a result, the digital camera 100 can record the image data at the passed time as the recorded image, and can transmit the recorded image to the smartphone 250.

As described in the above, in the system according to the present embodiment, the image data at the time corresponding to the timing of the release instruction by the user can be recorded. As a result, an influence of a release time lag caused by communication can be eliminated, and the image at the timing intended by the user can be recorded.

3. Third Embodiment

The first embodiment and the second embodiment illustrate the examples in the system composed of the single digital camera and the single smartphone. The present embodiment will describe a system composed of a plurality of digital still cameras (100A and 100B) and the single smartphone 250.

3-1. Configuration

Since configuration of the system in the present embodiment is similar to that in the first embodiment except for the configuration that the plurality of digital still cameras are used, description thereof will be omitted. Since the constitutions of the digital cameras and the smartphone in the third embodiment are similar to those in the first embodiment, description thereof will be omitted.

3-2. Operation 3-2-1. Connection between Plurality of Digital Cameras and Smartphone An operation for connecting between a plurality of digital cameras and the smartphone will be described with reference to FIG. 9. FIG. 9 is a sequence diagram relating the operation for connecting between a plurality of (for example, two) digital cameras 100A and 100B and the smartphone 250.

Since the operation (S900-S903, E900-E902) for connecting between the digital camera 100A and the smartphone 250 is similar to that in the first embodiment (in FIG. 4, S400-S403, E400-E402), description thereof will be omitted.

The operation for connecting between the digital camera 100B and the smartphone 250 in a state where the digital camera 100A and the smartphone 250 are connected each other will be described. When the digital camera 100B is powered ON, the controller 130 of the digital camera 100B supplies power to the respective units composing the digital camera 100B to control the digital camera 100B into a state in which the digital camera 100B can shoot an image and communicate with other devices.

Then, the user operates the operating unit 150 of the digital camera 100B to cause the liquid crystal monitor 123 to display the menu screen. The user operates the operating unit 150 to select a menu for providing the communication start instruction. When the user selects the menu for providing the communication start instruction (S904), the controller 130 searches for a connectable access point. The controller 130 is connected to the found access point to obtain an IP address. When completing the obtainment of the IP address, the digital camera 100B transits into the waiting state in which the digital camera 100B waits for the connection from the smartphone 250 (S905).

An operation on the side of the smartphone 250 will be described below. The user operates the touch panel 257 of the smartphone 250 already connected to the digital camera 100A to cause the liquid crystal monitor 256 to display the menu screen. Then, the user operates the touch panel 257 to select a selection item for providing the communication start instruction (connecting instruction) with respect to the digital camera 100B. With the selection by the user, the controller 251 of the smartphone 250 notifies the digital camera 100B of a connecting request via the communication unit 254 of the smartphone 250 (E903).

When receiving the connecting request, the controller of the digital camera 100E notifies the smartphone 250 of connecting permission via the communication unit 171 of the digital camera 100B (E904). As a result, the communication between the digital camera 100B and the smartphone 250 is established.

When the communication is established, the controller of the digital camera 100B transmits a through image generated by the imaging unit (a CCD image sensor, an image processor, and the like) of the digital camera 1003 to the smartphone 250 via the communication unit 171 of the digital camera 100B (E905). The imaging unit of the digital camera 100B generates a through image at, for example, 30 frames per second. The controller of the digital camera 100B periodically transmits the through image of 30 frames per second to the smartphone 250. The controller of the digital camera 100B continues to periodically transmit through images as long as the imaging unit generates a through image and the communication state with respect to the smartphone 250 is maintained.

The smartphone 250 periodically receives the through image (E905) from the digital camera 100B. The smartphone 250 displays the periodic through images (E905) received from the digital camera 100B and the periodic through image (E902) received from the digital camera 100A on the display monitor 256 of the smartphone 250 in a two-screen display manner.

With the above configuration, the smartphone 250 can receive and display the through images simultaneously from a plurality of digital cameras.

The above description illustrates the example that the communication is established via an access point other than the digital cameras 100A and 100B and the smartphone 250. However, the communication between the digital camera 100A, 100B and the smartphone 250 may be established by another method. For example, the digital cameras 100A, 100B and the smartphone 250 may establish the communication with means of an ad-hoc mode. In another manner, any one of the digital cameras 100A, 100B or the smartphone 250 has an access point function, and the device having the access point function may be connected to the another device so that the communication is established.

The present embodiment describes the example of the case in which a number of digital cameras that establish the communication with the smartphone is two, but the number of digital cameras may be three or more. In this case, the smartphone may multi-display through images transmitted from the three or more digital cameras with which the communication is established on the liquid crystal monitor 256. Further, the present embodiment describes the example of the case in which a number of the smartphone is one, but the system is implemented with a plurality of smartphones. In order to avoid collision of processes in the case where the instructions such as the zoom instruction are simultaneously provided from the plurality of smartphones to one digital camera, the digital camera may adopt the instruction content from the smartphones that transmits instruction at the earliest time, or the smartphone from which the digital camera preferentially receives the instruction may be predetermined.

3-2-2. Remote Zoom Operation to Plurality of Digital Cameras from Smartphone

The operation of the plurality of digital cameras 100A, 100B by means of the smartphone 250 will be described. In the present embodiment, the focal length of the digital camera 100A before the zoom operation is 25 mm, and the zoom change amount in each zoom operation is 5 mm in terms of the focal length. Further, the focal length of the digital camera 100B before the zoom operation is 25 mm, and the zoom change amount in each zoom operation is 6 mm in terms of the focal length. Further, the present embodiment will describe the example of the case in which the operation for zooming from the wide-angle side to the telephoto side is performed.

The digital cameras 100A, 100B are connected to the smartphone 250 as shown in FIG. 9, to transmit the through images (E902, E905). The through images (E902, E905) are images at the view angle corresponding to the focal length of 25 nm because the zoom operation is not yet performed. When receiving the through images (E902, E905) from the digital cameras 100A, 100B, the smartphone 250 displays the through images on the liquid crystal monitor 265 of the smartphone 250. At this time point, the focal length that the smartphone 250 instructs to the digital cameras 100A, 100B matches with the focal length corresponding to the view angle of the through image itself obtained from the digital camera 100.

When the user provides the first zoom instruction to the digital cameras 100A, 100B with the touch panel 257 of the smartphone 250, the smartphone 250 transmits first zoom request to the digital cameras 100A, 100B on the basis of the first zoom instruction by the user. Specifically, the smartphone 250 transmits a zoom request to the digital camera 100A so that the focal length is changed into 30 mm, and transmits a zoom request to the digital camera 100B so that the focal length is changed into 31 mm.

Since the operation of the digital cameras 100A, 100B after the reception of the zoom request is similar to that in the first embodiment, description thereof will be omitted.

The user continuously provides the second zoom instruction to the digital cameras 100A, 100B by using the touch panel 257 of the smartphone 250. At this time, the smartphone 250 transmits a second zoom request to the digital cameras 100A, 1002 on the basis of the second zoom instruction by the user. Specifically, the smartphone 250 transmits a zoom request to the digital camera 100A so that the focal length is changed into 35 mm, and transmits a zoom request to the digital camera 100B so that the focal length is changed into 37 mm.

Further, just after the smartphone 250 transmits the first zoom request to the digital cameras 100A, 100B, the cutting-out is carried out on the through images (E902 and E905) corresponding to the focal length of 25 mm received from the digital cameras 100A and 100B so that through images for display are generated to be displayed. Specifically, as to the through image in the digital camera 100A, the smartphone 250 generates, with the cutting-out, an image corresponding to the focal length of 30 mm from the through image (E902) corresponding to the focal length of 25 mm received from the digital camera 100A to display the generated image on the liquid crystal monitor 256. As to the through image in the digital camera 100B, the smartphone 250 generates, with the cutting-out, an image corresponding to the focal length of 31 mm from the through image (E905) corresponding to the focal length of 25 mm received from the digital camera 100B to display the generated image on the liquid crystal monitor 256 of the smartphone 250. That is to say, before receiving images resulting from the first zoom processes in the digital cameras 100A, 100B, the smartphone 250 can display images as if the images are performed the zoom processes in the digital cameras 100A, 100B to be displayed on the liquid crystal monitor 256. As a result, even when the smartphone 250 receives images from a plurality of digital cameras, the user can perform the zoom operation to the digital cameras 100A, 100B more comfortably without feeling of the delay time T.

In the present embodiment, the zoom request is transmitted to both the digital cameras 100A and 100B simultaneously, but the zoom request is not simultaneously transmitted to both of them and may be transmitted to any one of the digital cameras 100A and 100B. At this time, the user selects the digital camera that is currently established the communication as a digital camera to which the zoom request is transmitted. For example, when the user selects the digital camera 100A as the digital camera to which the zoom request is transmitted, by performing the cutting-out on only the through image received from the digital camera 100A, the smartphone 250 can display an image as if an image is performed the zoom process in the digital camera 100A to be displayed on the liquid crystal monitor 123. As a result, in the state that the communication is established between the single smartphone and the plurality of digital cameras, the zoom process can be performed to only one desired digital camera.

3-2-3. Remote Release Operation to A Plurality of Digital Cameras from Smartphone The digital cameras 100A, 100B are connected to the smartphone 250 as shown in FIG. 9, to periodically transmit the through images (E902 and E905). When receiving the through images (E902 and E905), the smartphone 250 displays a image on the liquid crystal monitor 256. At this time, identifiers for identifying through images and identifiers for identifying the digital cameras as transmission sources are given to the through images (E902 and E905) transmitted by the digital cameras 100A, 100B. The identifiers given to the through images by the digital cameras 100A, 100B are, for example, image generating time in the digital cameras 100A, 100B. The identifiers of through images may be uniquely identifiable for a certain period, and may be simply incremented numbers, alphabets, or the like. The identifiers for identifying the digital cameras 100A, 100B are IP addresses of the digital cameras or MAC addresses given to wireless LAN devices or the like. As the identifiers for identifying the digital cameras, numbers, which are assigned by the smartphone 250 when the smartphone 250 and the digital cameras 100A, 100B are connected each other, may be used.

In such a state, the user provides the release instruction to the digital camera 100 with the touch panel 257 of the smartphone 250. At this time, the smartphone 250 displays the through images (E902, 3905) on the liquid crystal monitor 256. The smartphone 250 transmits the release request to the digital cameras 100A, 100B on the basis of the release instruction provided by the user. At this time, the smartphone 250 transmits the identifiers of the through images transmitted from the digital cameras 100A, 100B to the digital cameras 100A, 100E together with the release request.

When receiving the release request and the identifier of through image from the smartphone 250, the digital cameras 100A, 100B refer to the identifier to specify image data generated at the time when the through image (E803) corresponding to that identifier is generated. The digital cameras 100A, 100B transmit the specified image data as a recorded image to the smartphone 250. The digital camera 100A and the digital camera 100B do not delete the image generated by the imaging unit even after the transmission of that image to the smartphone 250, and retains that image in the flash memory. At this time, the digital cameras 100A and 100B retain the image data transmitted from the digital cameras 100A, 100B to the smartphone 250 and the identifier corresponding to the image data in the flash memory for the delay time, for at least a period from the providing of the release instruction in the smartphone 250 and the actual execution of the release process in the digital cameras 100A, 100B. As a result, the digital cameras 100A, 100B can transmit the image data in the passed time.

As described above, in the system according to the present embodiment, image data at the time corresponding to the timing of the release instruction provided by the user can be recorded in the respective digital cameras. As a result, even in the system composed of the plurality of digital cameras, the influence of the release time lag caused by the communication can be eliminated, and the image at the timing intended by the user can be recorded.

Other Embodiments

As described above, the first to third embodiments are described as the example of the art disclosed in the present application. Therefore, the art in the present disclosure is not limited to them, and can be applied also to embodiments on which alternation, replacement, addition and omission are suitably carried out. Further, the components in first to third embodiments may be combined so that new embodiment is provided. Other embodiments will be illustrated below.

The above embodiments describe the zoom operation and the release operation in the smartphone. However, the contents of the present disclosure are not limited to these operations, and can be applied also to other operations. For example, the idea of the present disclosure can be applied also to an operation for changing image quality such as exposure and white balance in the smartphone 250. At this time, before receiving a through image on which the instruction contents from the digital camera 100 are reflected, the smartphone 250 performs the image quality changing process based on operation instructing contents on obtained through image to display the processed image on the liquid crystal monitor 256. As a result, the user can check, at the timing intended by the user, the through image of which image quality was changed.

Further, when the communication is established between the digital camera 100 and the smartphone 250, the smartphone 250 may obtain information about the menu screen of the digital camera 100 from the digital camera 100 in advance. As a result, also when the smartphone 250 requests the digital camera 100 to display the menu screen, the smartphone 250 can generate and display the menu screen on the basis of the obtained information in advance about the menu screen. As a result, the delay time T relating to the display of the menu screen can be reduced.

Further, before an image is recorded, the smartphone 250 may set a transmission destination (for example, the digital camera) to which the recorded image is transmitted in advance. As a result, when the release operation is performed in the smartphone 250 and the smartphone 250 receives a recorded image based on the release operation, the smartphone 250 can transmit the received recorded image to the set transmission destination.

Further, the above embodiments describe the zoom operation for changing the view angle from the wide-angle side into the telephoto side, but the zoom operation is not limited to this. The idea of the present disclosure can be applied also to a zoom operation for changing the view angle from the telephoto side into the wide-angle side. One example relating to generation of a through image in the digital camera 100 and a method for displaying a through image in the smartphone 250 in the zoom operation for changing the view angle from the telephoto side into the wide-angle side will be described with reference to FIGS. 10A and 10B.

In the digital camera 100, at first, the zoom state is set to the view angle corresponding to the focal length of 35 mm. a case in which the zoom instruction to be provided to the digital camera 100 is the zoom change amount in each zoom operation is 5 mm in terms of focal length will be described.

The user provides the zoom instruction for changing the view angle from the telephoto side into the wide-angle side to the digital camera 100 with the touch panel 257 of the smartphone 250. The smartphone 250 transmits the zoom request to the digital camera 100 on the basis of the zoom instruction by the user. That is to say, the smartphone 250 transmits the zoom request to the digital camera 100 so that the focal length is changed into 30 mm.

At this time, the smartphone 250 performs the cutting-out process shown in FIG. 10A or 10B in order to prevent the user from feeling the delay time T until the reflection of the result of the specified zoom process.

In the example shown in FIG. 10A, just after transmitting the zoom request to the digital camera 100, the smartphone 250 gives a band (for example, a black region) to the periphery of the through image corresponding to the focal length of 35 mm received from the digital camera 100 to generate an image corresponding to the focal length of 30 mm (after the through image received from the digital camera 100 is resized suitably), and then displays the generated image on the liquid crystal monitor 256 of the smartphone 250. The periphery of the displayed image corresponding to the focal length of 30 mm is hidden by the band, and the subject image is displayed in only the center portion of the displayed image. This image display enables the user to feel that the view angle is changed into the wide-angle side. Therefore, the user can perform the zoom operation to the digital camera 100 more comfortably without feeling the delay time T also in the operation for zooming from the telephoto side to the wide-angle side.

Further, in the example shown in FIG. 10B, the smartphone 250 cuts out through images with extra portions from through images periodically received from the digital camera 100 in advance, and then displays the cut-out through images on the liquid crystal monitor 256 of the smartphone 250. As a result, in the zoom operation from the telephoto side to the wide-angle side, the similar zoom operation can be provided without giving a band to the peripheries of display images.

For example, in the example of FIG. 10B, the smartphone 250 always cuts out through images with extra portions of 10 mm in terms of the focal length from through images periodically transmitted from the digital camera 100, and then displays the cut-out through images on the liquid crystal monitor 256 of the smartphone 250. For example, when the through images periodically transmitted from the digital camera 100 are images at the view angle corresponding to the focal length of 25 mm, the smartphone 250 cuts out an image which is 10 mm in terms of the focal length larger from the image corresponding to the focal length of 25 mm to generate a through image corresponding to the focal length of 35 mm, and then display the generated through image on the liquid crystal monitor 256. As a result, the through image corresponding to the focal length of 35 mm is presented to the user.

In this state, when the user provides the instruction for zooming to the wide-angle side to the digital camera 100 with the touch panel 257 of the smartphone 250, the smartphone 250 transmits the zoom request to the digital camera 100 on the basis of the zoom instruction by the user. Specifically, the smartphone 250 transmits the zoom request to the digital camera 100 so that the focal length is changed into 20 mm.

At this time, just after transmitting the zoom request to the digital camera 100, the smartphone 250 cuts out an image corresponding to the focal length of 30 mm (=20 mm+10 mm) from the through image corresponding to the focal length of 25 mm received from the digital camera 100, to generate a through image, and then displays the generated through image on the liquid crystal monitor 256 of the smartphone 250. As a result, the user can feel that the process for zooming to the wide-angle side is performed without giving a band to the periphery of the display image, and can perform the zoom operation to the digital camera 100 more comfortably without feeling the delay time T.

The third embodiment describes the recording operation corresponding to an image identifier in the plurality of digital cameras and the single smartphone. However, an image corresponding to a zoom position in the respective digital cameras may be recorded on the operation similar to that shown in FIG. 7.

It goes without saying that the idea of the present disclosure is not limited to a lens integrated-type camera, and can be applied also to a lens interchangeable-type camera.

The embodiments have been described above as examples of the art of the present disclosure. For this purpose, the detailed description and the attached drawings have been disclosed. Therefore, some of the elements described in the detailed description and shown in the attached drawings may be unnecessary to solve the problem. Therefore, the unnecessary element should not be instantly recognized as a necessary element merely because being described in the detailed description and shown in the attached drawings.

Further, The above described embodiments exemplify the art of the present disclosure. Therefore, The above described embodiments can be subject to various changes, substitutions, addition, omission and/or the like without departing from the scope of the claims and the their equivalent.

INDUSTRIAL APPLICABILITY

The idea of the present invention can be applied to the imaging apparatus for capturing an image and the communication apparatus that can communicate with the imaging apparatus and can perform the remote operation to the imaging apparatus. Specifically, the idea of the present disclosure can be applied to a digital camera, a movie camera and a smartphone.

What is claimed is:

1. An image communication apparatus communicating with an imaging apparatus, comprising:
   a user interface that receives an instruction for setting a shooting condition in the imaging apparatus;
   a communication interface that periodically obtains an image captured by the imaging apparatus from the imaging apparatus, and communicates a request for setting the shooting condition according to the instruction to the imaging apparatus when every time the user interface receives the instruction;
   a display device that displays the obtained captured image; and
   a controller that, when the request is communicated to the imaging apparatus, executes processes according to the instruction on the captured image obtained from the imaging apparatus to generate a display image based on the shooting condition set according to the instruction, and displays the generated display image on the display device before obtaining, from the imaging apparatus, an image which is captured based on the shooting condition set according to the request.

2. The image communication apparatus of claim 1, wherein
   the shooting condition is a zoom magnification, and
   when the request is transmitted to the imaging apparatus, the controller generates an image at a view angle corresponding to the zoom magnification indicated by the instruction from the captured image obtained from the imaging apparatus and displays the generated image on the display unit.

3. The image communication apparatus of claim 1, wherein the shooting condition is an exposure or a white balance, when the request is transmitted to the imaging apparatus, the controller generates an image with image quality corresponding to the condition indicated by the instruction, from the captured image obtained from the imaging apparatus, and displays the generated image on the display unit.

4. A mobile communication apparatus capable of performing a wireless communication with an imaging apparatus, the mobile communication apparatus comprising:
   an obtaining unit operable to periodically obtain an image captured by the imaging apparatus;
   a display unit operable to display the captured image obtained by the obtaining unit;
   an operating unit operable to receive an instruction from a user for performing a remote operation to alter an imaging condition of the imaging apparatus;
   a communication unit operable to transmit a request for performing the remote operation to the imaging apparatus based on the instruction by the user received by the operating unit, every time the instruction is received; and
   a controller operable to execute a process on the captured image obtained from the imaging apparatus to simulate the altered imaging condition according to the instruction and to display the captured image subjected to the process when the request for performing the remote operation is transmitted to the imaging apparatus.

5. The mobile communication apparatus according to claim 4, wherein the instruction received by the operating unit to alter the imaging condition of the imaging apparatus is a remote zoom operation.

6. The mobile communication apparatus according to claim 5, wherein the process executed on the captured image by the controller to simulate the remote zoom operation is to cut-out a predetermined portion of the captured image.

* * * * *